Dec. 19 1922.

B. M. ESTES,
EDUCATIONAL GAME,
FILED JULY 24, 1920.

1,439,359

Inventor
Mrs Blanche Estes.

Patented Dec. 19, 1922.

1,439,359

UNITED STATES PATENT OFFICE.

BLANCHE M. ESTES, OF PEKIN, ILLINOIS.

EDUCATIONAL GAME.

Application filed July 24, 1920. Serial No. 398,736.

*To all whom it may concern:*

Be it known that I, BLANCHE M. ESTES, a citizen of the United States, residing at Pekin, in the county of Tazewell and State of Illinois, have invented certain new and useful Improvements in an Educational Game, of which the following is a specification.

My invention relates to an educational toy and design medium.

A prime object is to provide an article of this kind utilizing puzzle blocks with which a number of independent pictures may be made on the board at the same time and which pictures may selectively be placed at various distances from each other and in varied locations, in order to provide a more instructive and fascinating problem to the child to develop the constructive faculties.

I further aim to provide an article of this kind which may be useful to adults as well as children, for instance in the way of controlling scenes of people, animals, villages, landscapes, crochet designs, quilt blocks, book covers, stencil work and other flat work.

I also aim to provide an efficient and novel means for containing the parts of the apparatus and for the assemblage and retention of the blocks on the board.

With the above and additional objects such as will appear hereinafter as the description progresses, in view, the invention has been embodied in one preferred form as illustrated in accompanying drawings, wherein:—

Figure 1:
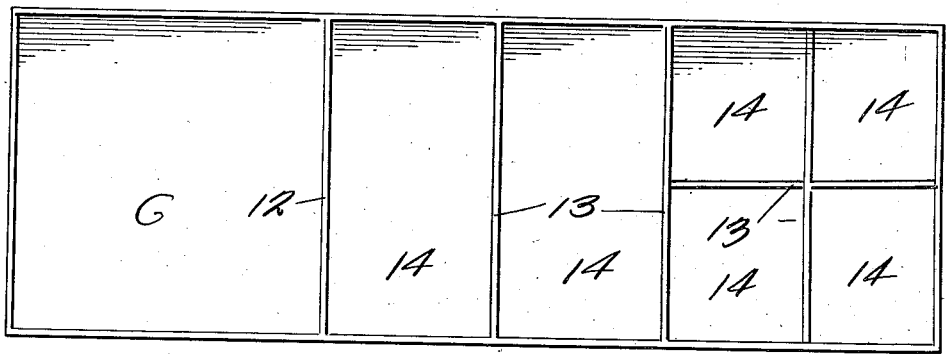
Figure 1 is a plan view of the box or container for the same pieces.
Figure 2:
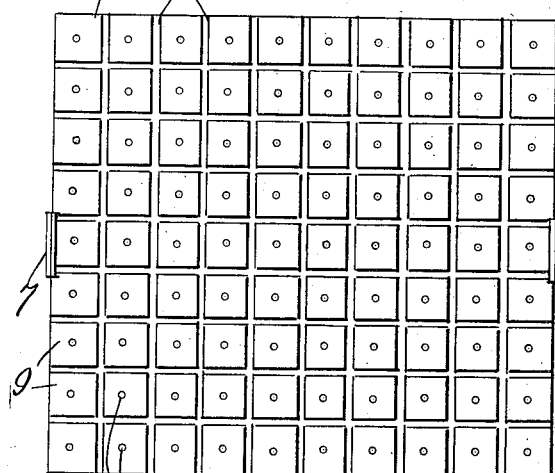
Figure 2 is a plan view of the assembling board.

Referring specifically to the drawings wherein like reference characters designate like or corresponding parts throughout the several views, A designates the assembling board, which may be of any suitable size and which is preferably made of wood, with flexible handles 7 thereon as shown. The surface of the board is also grooved at 8 to provide squares 9 upon which blocks hereinafter described are assembled. In the center of each square, a tapered recess 10 is provided.

The blocks which are shown at B may be made of wood or other suitable material in any desired sizes or shapes. These blocks have prongs or pins 11 extending centrally from one face thereof and adapted to be inserted into the recesses 10. On these blocks suitable indicia is delineated, as by painting or the application of paper upon which the same is printed.

Figure 3:
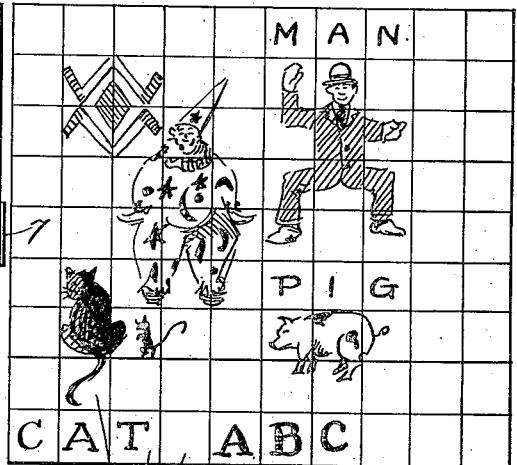
Figure 3 is a plan view of the assembling board covered with blocks producing a picture.
Figure 4:
Figure 4 is a cross section of the assembling board.
Figure 5:
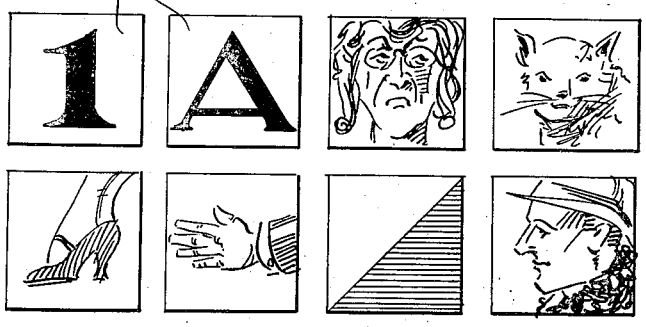
Figure 5 illustrates plan views of a group of blocks which may be used.
Figure 6:
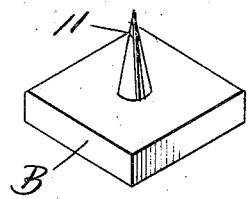
Figure 6 is a perspective view of one of the blocks.

The number of the blocks B greatly exceeds the number of the squares or blocks on the board A. For instance, I may have a block for each letter of the alphabet, a block for any desired number of numerals, blocks collectively representing an emblem, a cat, a pig, a clown, a man in an unusual position, an old maid, a shoe, a hand, heads, different colors, etc. It is to be noted in Figure 3 that the blocks comprising each of the subjects are separate and distinct from the remainder of the blocks. In this way, I may make separately, a plurality of subjects on the same board but in the same design or picture. These separate subjects may be arranged at any desired distance from each other and in any desired locations so that the constructive faculties may be exercised practically without limit. By way of example, it will be seen that the blocks which cooperate to provide the picture of the cat have no other delineation upon them. If desired, the position of these blocks may be changed, say put in the location of those picturing the pig and the latter occupying the space vacated by the blocks picturing the cat. Such exchanges of location and arrangements may be made by all of the independent designs. Associated with these pictures, the numeral blocks or alphabetical blocks may be optionally used. By having a very large assortment of the blocks on hand, a great many pictures, designs, etc., may be delineated.

The provision of the grooves 8 render the surfaces 9 which receive the blocks separate so that if the board should warp or become distorted, there is less likelihood of these individual blocks becoming distorted. When the board is used by a child around a sand pile for instance, sand which may fall on the board, will be moved into the grooves as the blocks are positioned, so as not to interfere with the blocks resting flat on the board.

It will be understood that in assembling the blocks B, their prongs 11 are inserted into the recesses 10 removably.

A cabinet or retainer for the game pieces and parts is shown in Figure 1 and this may be a wooden or pasteboard box, having a partition 12 to provide a space C for the game board and other partitions 13 providing suitable compartments 14 to receive the blocks or game pieces B, the latter usually being arranged according to subjects.

Since merely the preferred embodiment of the invention has been illustrated and described, it is to be understood that changes in the details of construction may be resorted to within the spirit and scope, as defined by appended claim.

I claim:

A puzzle comprising a board having a plurality of grooves dividing the surface into squares, said squares having central recesses, blocks covering the squares having prongs to enter said recesses, said blocks being interchangeable and having indicia thereon to form various objects at selected positions over the surface of the board.

In testimony whereof, I have affixed my signature in the presence of two witnesses.

BLANCHE M. ESTES.

Witnesses:
BERTHA SARVER,
SUSAN POOL.